United States Patent
Dieterich et al.

[15] 3,647,126
[45] Mar. 7, 1972

[54] TIRE-FABRIC-HANDLING APPARATUS

[72] Inventors: Donald B. Dieterich, Cuyahoga Falls; George L. Schrum, Tallmadge, both of Ohio

[73] Assignee: Akron Standard, a division of Eagle Picher Industries, Inc., Cincinnati, Ohio

[22] Filed: Mar. 30, 1970

[21] Appl. No.: 23,748

[52] U.S. Cl. ............................................226/105, 156/405
[51] Int. Cl. ....................................................B65h 17/18
[58] Field of Search ............226/104, 105, 19, 20; 156/405, 156/406, 126; 198/202; 74/242, 243

[56] References Cited

UNITED STATES PATENTS

| | | | |
|---|---|---|---|
| 2,588,207 | 3/1952 | Cleland et al. | 156/126 |
| 3,446,933 | 5/1969 | Taylor et al. | 226/19 X |
| 3,323,969 | 6/1967 | Cantarutti et al. | 226/105 X |
| 3,017,312 | 1/1962 | Kraft | 156/406 X |

*Primary Examiner*—Allen N. Knowles
*Assistant Examiner*—Gene A. Church
*Attorney*—Mack D. Cook, II

[57] ABSTRACT

Apparatus for handling large diameter rolls of tire fabric for placement on a tire building drum. Apparatus is floor mounted and fabric is let off at controlled rate and registered laterally for selective delivery to the building drum.

2 Claims, 2 Drawing Figures

INVENTORS.
GEORGE L. SCHRUM
DONALD B. DIETERICH
BY Hamilton, Cook,
Renner & Kenner
ATTORNEYS

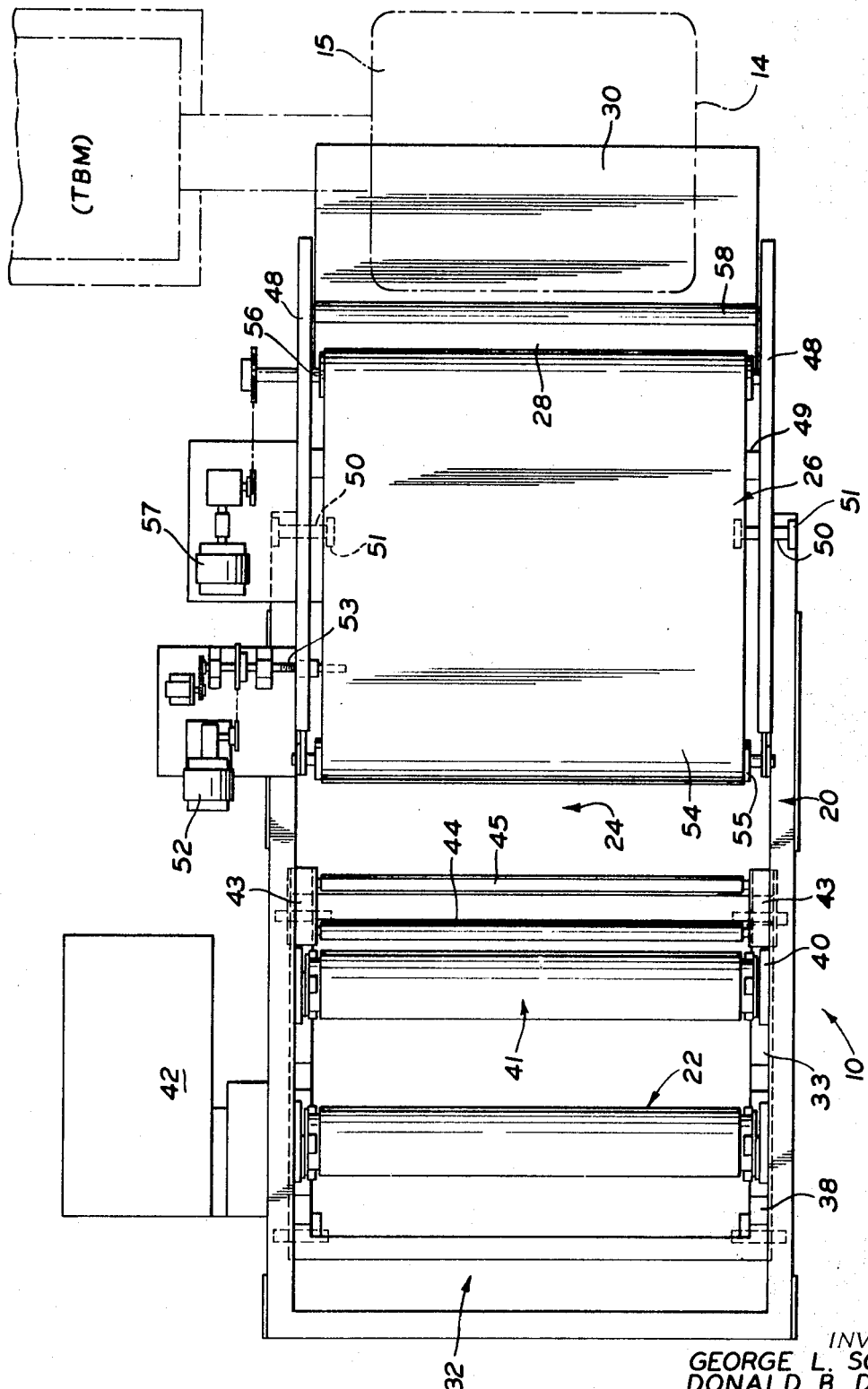

TIRE-FABRIC-HANDLING APPARATUS

BACKGROUND OF THE INVENTION

The present invention relates to the efficient and precise handling of "tire fabric" during the operations of "building" an unvulcanized tire on a "building drum." A "tire fabric," stock or ply material may be a rubber or plastic coated or impregnated sheet or layer of woven or knitted natural, synthetic or reinforced fibers or strands. Apparatus according to the invention receives large diameter tightly wound rolls of tire fabric. The "building" or construction of an unvulcanized tire requires exact positioning or placing of the unwieldy laminate ply layers in relation to each other and to other components of the tire, including the bead wire bundles. Although apparatus according to the invention may be used to supply tire fabric to or "service" any of several types of "building drum," all such building drums will have a generally cylindrical working surface rotating on an axis.

When building a tire having many laminate ply layers or plies, such as a heavy duty truck or off-the-road tire which may have eight or more plies, it is desirable to vary or "step" the ply edges to facilitate turning under and around the bead wire. Ply stepping or staggering the vertical relation of the plies to accomplish a "feathering effect" will permit smooth, symmetrical and tight wrapping of the bead wires when the lateral edges of the plies are turned up.

Heretofore, ply stepping has been possible by lateral shifting of the working surface of the building drum to a different position with respect to the center line of the servicer or by staggering the ply material prior to take off from the supply drum. However, it has now been found that handling of the tire fabric according to the concepts of the present invention will enable unwieldy laminate ply layers to be exactly positioned or placed on the building drum in any desired vertical or radially outward relation or configuration.

SUMMARY OF THE INVENTION

The object of the invention is to provide apparatus which will efficiently and precisely handle tire fabric during the operations of building an unvulcanized tire on a building drum. More particularly, the object is to provide apparatus which will permit exact positioning or placing of unwieldy laminate ply layers in relation to each other and to other components of the tire, including the bead wires. Specifically, it is an object to provide apparatus which will permit smooth, symmetrical and tight wrapping of the bead wires when the lateral edges of the plies are turned up.

These and other objects of the invention, and the advantages thereof, will be apparent in view of the Description of a Preferred Embodiment as set forth below.

In general, apparatus according to the invention for handling tire fabric during the operations of building an unvulcanized tire on a building drum having a generally cylindrical working surface rotating on an axis, has a frame adapted to receive a drum for carrying a large diameter roll of tire fabric, and a drive means to selectively rotate the drum and let off the tire fabric. The frame houses a storage festoon adjacent the drum to form a down-hanging loop of fabric and also carries a longitudinal conveyor adjacent the storage festoon, which is shiftable on the frame transverse the direction of fabric feed. The frame also houses a drive means which selectively actuates the conveyor to feed the fabric toward the building drum via a small slack festoon. The conveyor drive means is actuated to feed the fabric at a speed corresponding to the speed at which the fabric is positioned on the working surface of the drum by a sensing mechanism mounted on the exit side of the slack festoon.

The frame is further adapted to receive an assembly for mounting the drum carrying the large diameter roll of tire fabric and for forming the entry side of the storage festoon. An additional drive means selectively shifts the conveyor on the frame and in relation to a tire-building drum. The assembly for mounting a drum also has a carriage movable transverse the center line of the apparatus by an actuating mechanism which is synchronized with the drive means so that the carriage may be selectively shifted with the conveyor. The carriage has stanchions rotatably mounting the drum and a second set of stanchions rotatably mounting a second drum for taking up an interleaved sheet of plastic liner on a roll of tire fabric prior to entry of the tire fabric into the storage festoon.

DESCRIPTION OF THE DRAWINGS

FIG. 2 is a plan view thereof.

DESCRIPTION OF A PREFERRED EMBODIMENT

Figure 1:
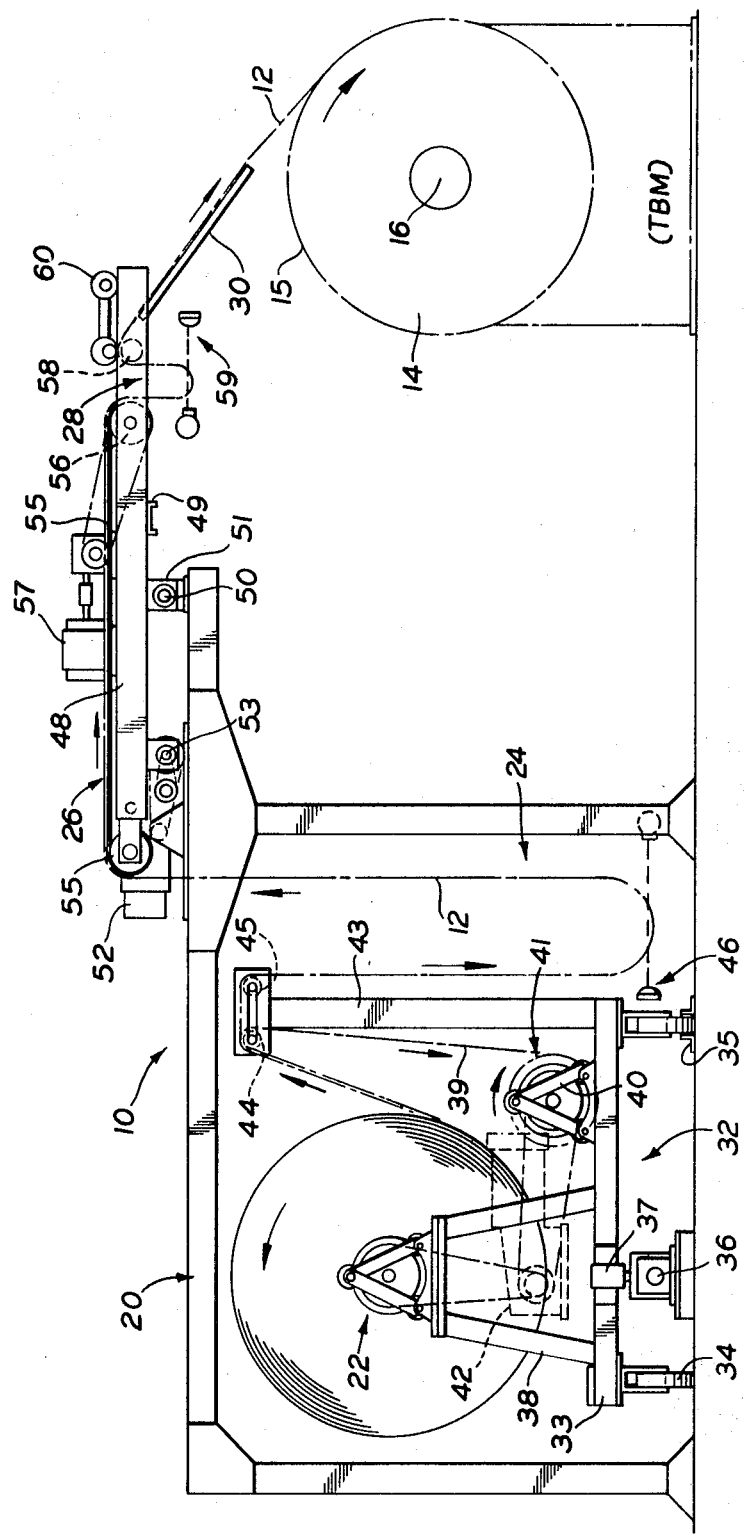
FIG. 1 is a view of apparatus for handling tire fabric according to the invention.

A tire building machine servicer according to the invention is indicated generally by the numeral 10. The servicer 10 supplies tire fabric, stock or ply material 12 (indicated by the chain line in FIG. 1) to a tire building machine (TBM) having a drum 14 with a generally cylindrical working surface 15 rotating on an axis 16.

The main structural component of a servicer 10 is a frame 20 floor mounted in alignment with the drum 14. The frame 20 has an opening adapted to receive a drum 22 carrying a large diameter roll of fabric 12 (e.g., a roll 64 inches wide × 500 yards long weighing approximately 2,500 pounds). The frame 20 also houses a large storage festoon 24 to form a down-hanging loop of fabric. The frame 20 also carries a longitudinal conveyor 26 moving the fabric 12 toward the drum 14 via a small slack festoon 28. At the end of the frame 20, the fabric 12 is led from the slack festoon 28 down and over a suitable guide pan 30 to the working surface 15 of the drum.

As best shown in FIG. 1, the structural elements for mounting the fabric drum 22 and for forming the entry side of the large storage festoon 24 may be integrated into one assembly 32. An assembly 32 may comprise a carriage 33 moving on wheels 34 running in a track 35 floor mounted transverse the center line of the servicer 10. The carriage 33 may be moved into and out of registry within the frame 20 or selectively shifted with the longitudinal conveyor 26 as by a suitable mechanism in such as a floor mounted cylinder 36 and a connecting latch mechanism 37.

The carriage 33 has dual stanchions 38 rotatably mounting the ends of the fabric drum 22. Customarily, rolls of tire fabric 12 have an interleaved continuous sheet of plastic liner 39 (indicated by the chain line in FIG. 1) to prevent self-adherence of the layers. Therefore, the carriage 33 has a second set of dual stanchions 40 rotatably mounting the ends of a liner takeup drum 41. Both drums, 22 and 41, are driven in synchronized relation as by a suitable motor and power transmission mechanism 42 to let off the tire fabric 12 and take up the liner 39.

The carriage 33 also mounts a pair of upright members 43 carrying guide rollers 44 and 45. The tire fabric 12 from the roll on drum 22 is led up and over rollers 44 and 45 to define the entry side of the storage festoon 24. The plastic liner 39 is led around roller 44 to the takeup drum 41. The extent of the down-hanging loop of fabric 12 in festoon 24 (as shown by the chain lines in FIG. 1) is controlled as by a photoelectric-eye-sensing mechanism 46 selectively actuating the motor and power transmission mechanism 42.

The longitudinal conveyor 26 is cantilevered on the frame 20 and extends from the exit side of the storage festoon 24 toward the building drum 14. The sub frame of the conveyor 26 includes side beams 48 and tie beams 49 mounted on a transverse bearing shaft 50. The conveyor shaft 50 is slidably mounted in journal blocks 51 on the end of the frame 20. Intermediate the end of the frame 20 and the large storage festoon 24, is a suitable motor and power transmission mechanism 52 for driving a bracket mounted transverse drive shaft 53. The drive mechanism 52 may be selectively actuated by the operator of the TBM to provide desired increments of transverse shifting of the conveyor 26. Also, it is preferable when the increment of shifting is relatively great that actuation of the drive mechanism 52 be synchronized with an actuation of the mechanism 36 for moving the carriage 33 mounting the fabric drum 22.

The fabric-conveying surface of the conveyor 26 may be provided by a continuous belt 54 looped around rollers 55 and 56. Mounted on one conveyor side beam 48 is a suitable motor and power transmission mechanism 57 for driving roller 56 and the belt 54. The free end of the conveyor 26 has a crossroller 58 to define the exit side of the slack festoon 28. The extent of the down hanging loop of fabric 12 in festoon 28 (as shown by the chain lines in FIG. 1) is controlled as by a photoelectric-eye-sensing mechanism 59 selectively actuating the drive mechanism 57.

During positioning of the tire fabric 12 on the working surface 15 of the drum 14, the drive mechanism 57 is also actuated to feed the fabric at a speed corresponding to the speed at which the fabric is so positioned. This may be controlled as by a tachometer generator and roll-sensing mechanism 60 suitably mounted on the exit side of the slack festoon 28 and contacting the fabric 12 (see FIG. 1) prior to movement down and over the guide pan 30 to the working surface 15 of the drum.

While a preferred embodiment of the invention has been shown and described, it should be apparent that various changes and modifications could be made without departing from the spirit of the invention. For example, the apparatus 10 could be adapted to receive two rolls of fabric 12, with the frame 20 having two storage festoons 24, two conveyors 26, etc., superimposed in relation to each other so as to increase the available supply of tire fabric to the building drum 14. Therefore, the true spirit and scope of the invention should be determined solely by the appended claims.

We claim:

1. Apparatus 10 for handling tire fabric 12 during the operations of building an unvulcanized tire on a building drum 14 having a generally cylindrical working surface 15 rotating on an axis 16, said apparatus comprising a frame 20 adapted to receive a drum 22 carrying a large diameter roll of tire fabric, drive means 42 to selectively rotate said drum to let off said tire fabric, said frame housing a storage festoon 24 adjacent said drum to form a down-hanging loop of fabric and carrying a longitudinal conveyor 26 adjacent said storage festoon, said conveyor being shiftable on said frame transverse the direction of fabric feed, and drive means 57 to selectively actuate said conveyor to feed said fabric toward said building drum via small slack festoon 28, said conveyor drive means 57 being actuated to feed the fabric at a speed corresponding to the speed at which the fabric 12 is positioned on the working surface 15 of the drum by a sensing mechanism 60 mounted on the exit side of the slack festoon 28.

2. Apparatus 10 for handling tire fabric 12 during the operations of building an unvulcanized tire on a building drum 14 having a generally cylindrical working surface 15 rotating on an axis 16, said apparatus comprising a frame 20 which is adapted to receive an assembly 32 for mounting a drum 22 carrying a large diameter roll of tire fabric and for forming the entry side of a storage festoon 24 and which carries a longitudinal conveyor 26 adjacent said storage festoon, said conveyor being shiftable on said frame transverse the direction of fabric feed, there also being drive means 57 to selectively actuate said conveyor to feed said fabric toward said building drum and additional drive means 52 to selectively shift said conveyor on said frame and in relation to a building drum, said assembly 32 comprising a carriage 33 movable transverse the center line of the apparatus by an actuating mechanism 36, the actuating mechanism 36 and the drive means 52 being synchronized so that the carriage 33 may be selectively shifted with the conveyor 26, said carriage 33 also having stanchions 38 rotatably mounting the drum 22 and a second set of stanchions 40 rotatably mounting a second drum 41 for taking up an interleaved sheet of plastic liner 39 on a roll 22 of tire fabric prior to entry of the tire fabric 12 into storage festoon 24.

* * * * *